(12) United States Patent
Dwivedi

(10) Patent No.: US 12,217,331 B2
(45) Date of Patent: Feb. 4, 2025

(54) OPTIMIZING GRID-BASED COMPUTE GRAPHS

(71) Applicant: NVIDIA Corporation, Santa Clara, CA (US)

(72) Inventor: Shekhar Dwivedi, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 211 days.

(21) Appl. No.: 17/955,380

(22) Filed: Sep. 28, 2022

(65) Prior Publication Data

US 2024/0104790 A1 Mar. 28, 2024

(51) Int. Cl.
G06T 11/00 (2006.01)
G06T 1/20 (2006.01)
G06T 1/60 (2006.01)

(52) U.S. Cl.
CPC ............. *G06T 11/00* (2013.01); *G06T 1/20* (2013.01); *G06T 1/60* (2013.01)

(58) Field of Classification Search
None
See application file for complete search history.

(56) References Cited

U.S. PATENT DOCUMENTS

| 9,787,705 | B1* | 10/2017 | Love | G06F 16/9024 |
|---|---|---|---|---|
| 11,023,421 | B1* | 6/2021 | Timmons | G01C 21/3446 |
| 2001/0039487 | A1* | 11/2001 | Hammersley | G06T 17/005 |
| | | | | 703/2 |
| 2010/0026692 | A1* | 2/2010 | Lew | G06T 1/20 |
| | | | | 345/506 |
| 2016/0070767 | A1* | 3/2016 | Karras | G06T 15/80 |
| | | | | 707/602 |
| 2019/0377819 | A1* | 12/2019 | Filliben | G06N 3/084 |
| 2020/0167786 | A1* | 5/2020 | Kursun | H04L 63/08 |
| 2022/0156322 | A1* | 5/2022 | Singh | G06F 16/9024 |
| 2023/0281391 | A1* | 9/2023 | Mamy | G06T 11/206 |
| | | | | 704/9 |
| 2023/0401423 | A1* | 12/2023 | Sim | G06N 20/00 |

* cited by examiner

*Primary Examiner* — James A Thompson
(74) *Attorney, Agent, or Firm* — Lowenstein Sandler LLP

(57) ABSTRACT

Disclosed are apparatuses, systems, and techniques that enable compressed grid-based graph representations for efficient implementations of graph-mapped computing applications. The techniques include but are not limited to selecting a reference grid having a plurality of blocks, assigning nodes of the graph to blocks of the grid, and generating a graph representation that maps directions, relative to the reference grid, of nodal connections of the graph.

22 Claims, 10 Drawing Sheets

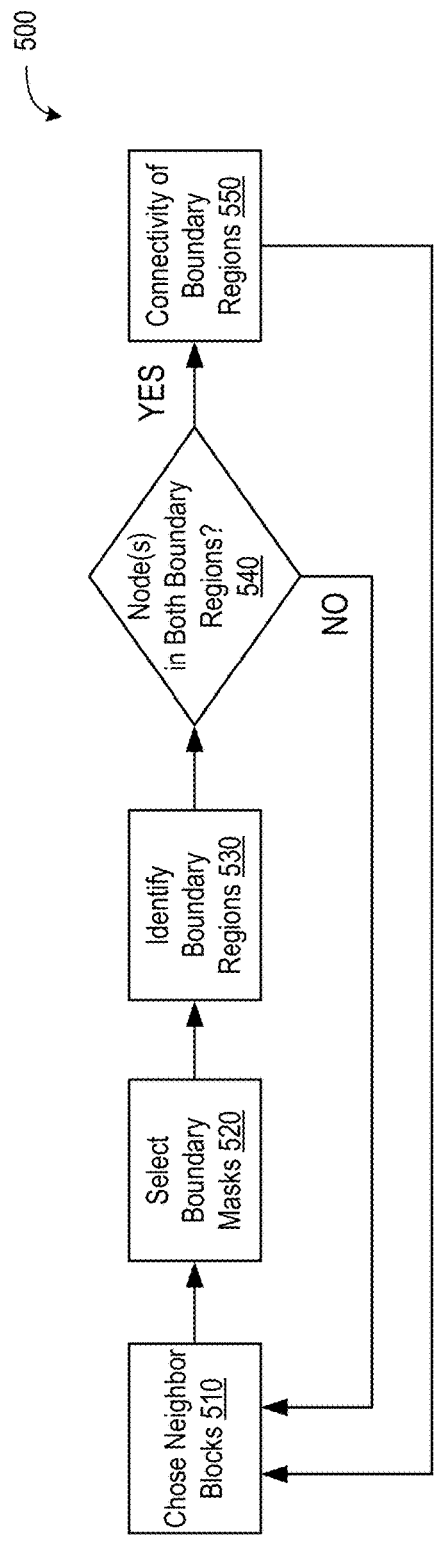
FIG. 5A
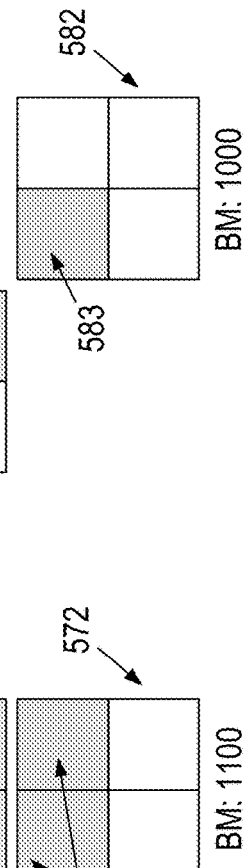
FIG. 5D
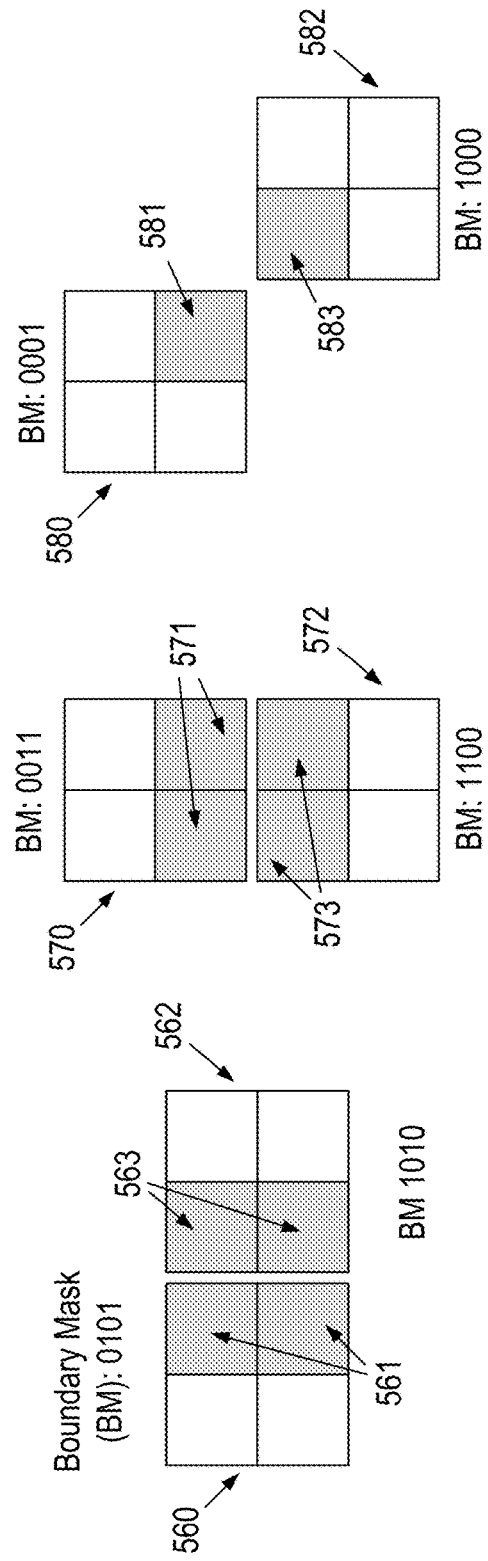
FIG. 5C
FIG. 5B

OPTIMIZING GRID-BASED COMPUTE GRAPHS

TECHNICAL FIELD

At least one embodiment pertains to processing resources and techniques facilitating performance of computational operations that use graphs to represent complex relationships between objects of computational operations and/or software/hardware resources used to perform computing operations. More specifically, at least one embodiment pertains to improving computational efficiency of graph-based applications.

BACKGROUND

A graph consists of nodes (vertices) connected via edges (arcs). Computational operations often use nodes to represent various objects, e.g., map points (street addresses), pixels of an image, units of an organization, software resources of a processing pipeline, hardware components of a distributed computational platform, computing devices connected in a network, and the like. Graph edges can represent relations between nodes, e.g., paths connecting map points, object associations between parts of an image, interactions between units of an organization, data flows in a processing pipeline, associations between computational tasks, and the like. A graph used by a complex computing application can have a very large number of nodes and edges.

BRIEF DESCRIPTION OF DRAWINGS

FIGS. 5A-D illustrate one example implementation of graph operations in which a compressed grid-based representation may be used, according to at least one embodiment;

DETAILED DESCRIPTION

Figure 1A:
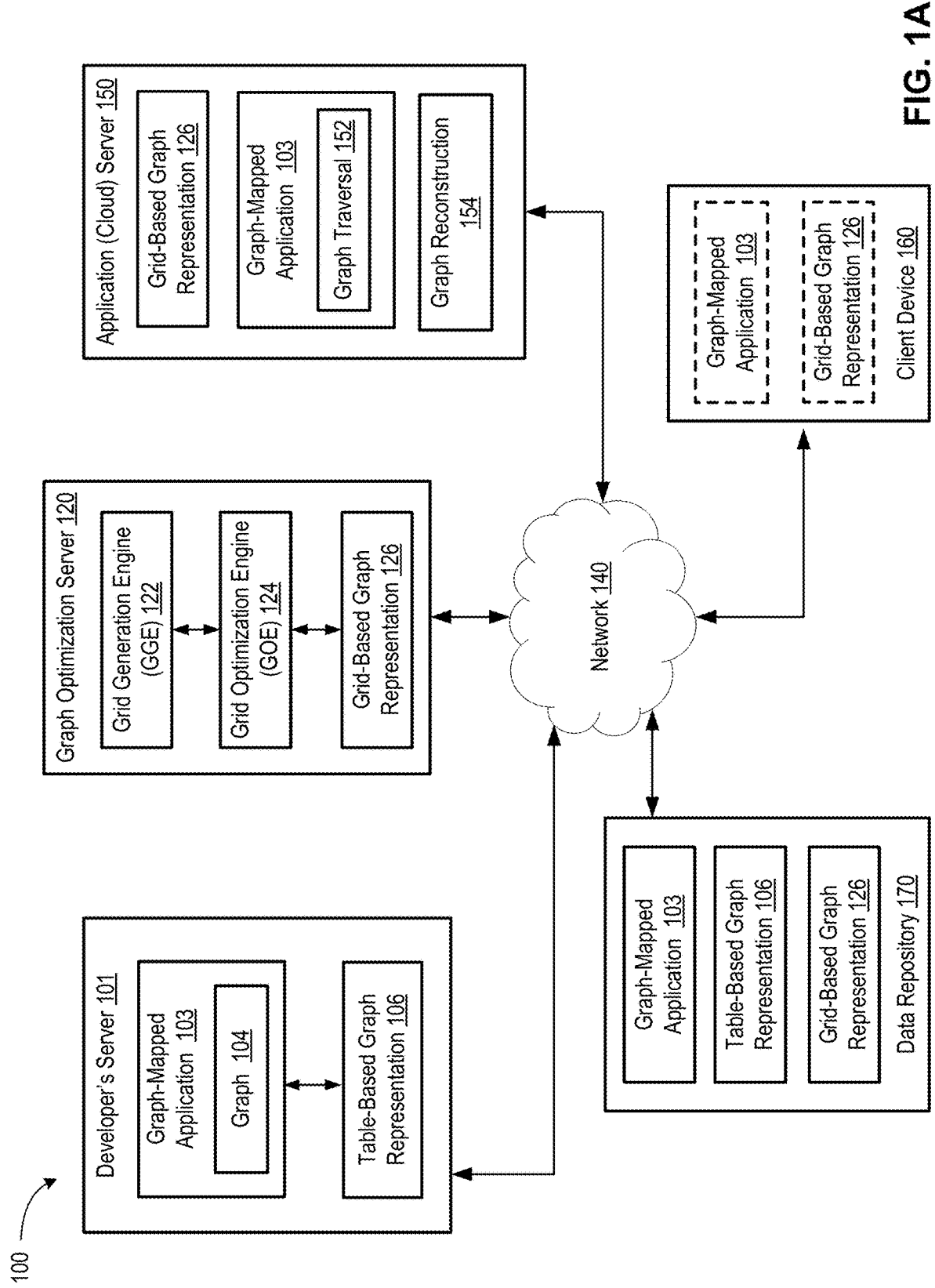
FIG. 1A is a block diagram of an example computing architecture that supports grid-based graph representations for graph-mapped computing applications, in accordance with at least some embodiments.

Graphs provide efficient and convenient representations of data, objects, and resource structures in many modern computational applications. Such applications may include navigation applications, video and image processing (including medical imaging) applications, simulation and rendering applications, machine learning applications (including deep neural networks), social networking applications, distributed computing applications, and so on. A graph can be defined via an adjacency list that stores, for various nodes of the graph, a list of all other nodes connected to a given node. An adjacency list can further store, for various edges of the graph, a source node and a destination node. An adjacency list can be stored in the form of a hash map (hash table of key-value pairs) that hashes identifications of nodes/edges (keys) to the lists of nodes (values). A graph may be stored as a square adjacency matrix, in which rows represent source vertices and columns represent destination vertices (or vice versa). A graph may also be stored as a rectangular incidence matrix, in which rows represent vertices and columns represent edges. A graph used in a typical complex application may be a densely connected graph representing hundreds of thousands (or more) of nodes and edges and stored as a list, matrix, map, etc. As a result, storing a graph and performing various operations with the graph, such as searching the graph for a shortest (or most optimal) path, traversing the graph, or performing any other computational operation can occupy significant computing resources and require long processing times.

Aspects of the present disclosure address these and other challenges of the existing computational technology by providing for methods and systems that facilitate efficient lossless compression of graphs and performance of various graph operations using compressed graph representations. In some embodiments, lossless graph compression may be achieved by assigning nodes of a graph to cells of a suitably chosen reference grid. A reference grid (or grid, as used herein for conciseness) may include a lattice of cells of a suitable geometry (e.g., a square lattice, a triangular lattice, etc.) and dimensionality (e.g., a two-dimensional grid, a three-dimensional grid, etc.) that may be selected based on the number of nodes and/or an average number of edges per node in the graph (e.g., with higher dimensionalities used to represent more densely connected graphs). Assignment of nodes to cells may be performed using an appropriate set of grid rules. For example, a cell may host one node (or no nodes) and an edge may connect nodes assigned to adjacent cells. To accommodate long edges that initially reach over multiple cells, long edges may be split, using additional dummy nodes, into shorter segments that connect nodes (real or dummy) located in adjacent cells. Locations for various nodes (including dummy nodes) in the grid may be finalized in the course of compactifying the grid (reducing the size of the grid), by moving into empty cells, eliminating some of the dummy nodes, and so on. The resulting grid provides a reference frame for specifying locations of nodes and directions of edges connecting the nodes. For example, a block of one or more (e.g., four in the instance of a two-dimensional grid) cells may be encoded using a bit stream of binary data values that includes a first portion containing positional bits that specify presence or absence of nodes within various cells of the block, e.g., with positional bit value 1 (or 0) indicating presence (or absence) of a node in the respective cell of the block. The bit stream may further include a second portion containing directional bits that specify, for each cell occupied by a node, directions of one or more edges of that node. Each of N spatial directions towards adjacent cells (e.g., N=8, in the instance of a two-dimensional grid) may be characterized by a corresponding directional bit, e.g., with the directional bit value 1 (or 0) indicating present (or absence) of a node in a cell adjacent to the given cell along the corresponding one of N spatial directions.

The compressed representation may be used to perform a number of computational operations. For example, the compressed representation may be used to communicate a graph over a network or store the graph in a computer memory. Upon receiving or retrieving the bit stream of a graph, the compressed representation may be used to reconstruct the uncompressed graph in any desired form, such as an adjacency map or matrix, e.g., by matching the positional bits and directional bits within adjacent blocks, removing the dummy nodes and so on. The compressed representation may also be used for identifying closed clusters (sub-graphs) of nodes that are disconnected from other parts of the graph. For example, a boundary mask may be generated and applied to bit streams of two adjacent blocks, with the boundary mask selecting from each bit stream those specific positional and directional bits that signal existence (or non-existence) of an edge that connects the two blocks. The existence of such an edge indicates that the blocks include nodes that belong to the same cluster. The compressed representation may further be used to perform a grid traversal operation (e.g., using a depth-first search algorithm or a breadth-first search algorithm), identify a shortest path between any given nodes, identify an optimal path between any given nodes, and so on. For example, during a graph traversal operation, an existence of a path extending from a given block may be identified using the boundary masks applied to pairs of blocks that include the given block and one of the adjacent blocks. If an edge is found that connects the two blocks, the traversal/search algorithm may add the new block(s) into the queue of blocks scheduled for visiting. The bit streams may also be used to construct multi-level compressed representations of graphs, e.g., with blocks consisting of individual grid cells at the first level, blocks consisting of M cells at the second level, superblocks consisting of M blocks at the third level, and so on.

FIG. 1A is a block diagram of an example computing architecture 100 that supports grid-based graph representations for graph-mapped computing applications, in accordance with at least some embodiments. As depicted in FIG. 1A, a computing architecture 100 may include a developer's server 101, a graph optimization server 120, an application server 150, a client device 160, a data repository 170, and other devices not explicitly shown in FIG. 1A. Any or all of the devices of computing architecture 100 may be connected to a network 140. Network 140 may be a public network (e.g., the Internet), a private network (e.g., a local area network (LAN), a wide area network (WAN), etc.), a wireless network, a personal area network (PAN), or a combination thereof.

Any devices shown in FIG. 1A may be (or include) a desktop computer, a laptop computer, a smartphone, a tablet computer, a server, a computing device that accesses a remote server, a computing device that utilizes a virtualized computing environment, a computing device that uses any number of CPUs and GPUs, including virtual CPUs (vCPUs) and/or virtual GPUs (vGPUs), or any other suitable computing device capable of performing the techniques described herein. Developer's server 101 may host a graph-mapped application 103, which may be any application that utilizes a graph 104 for mapping of software processes, hardware resources, data structures, memory pages, geographic locations, a set of associated objects, a list of users, and the like. For example, graph-mapped application 103 may be a navigation application that includes a set of geographic locations, e.g., street addresses, intersections, restaurants, stores, points of interest, and the like, which may be mapped as a set of nodes (vertices) of graph 104. Nodes may be linked via edges (nodal connections, arcs) and may represent roads, public transportation lines, bicycle trails, etc. In another example, graph-mapped application 103 may be a communication application with graph 104 mapping linked devices. In one example, graph-mapped application 103 may be a personnel chart with graph 104 mapping organizational structure of employees of an organization. In one example, graph-mapped application 103 may be a document library with nodes of graph 104 mapping stored documents and edges of graph 104 mapping contextual associations of these stored documents. In one example, graph-mapped application 103 may be an electrical circuit diagram with nodes of graph 104 mapping electrical connections and edges of graph 104 mapping electrical devices connected to the nodes. In one example, graph-mapped application 103 may be a data flow with nodes of graph 104 mapping data operations and edges of graph 104 mapping conditional paths of data traffic. In one example, graph-mapped application 103 may be a system of distributed computational resources with nodes of graph 104 mapping processing software sub-tasks and edges of graph 104 mapping the order of sub-task distribution. In one example, graph-mapped application 103 may be a neural network with nodes of graph 104 representing neurons and edges of graph 104 representing neural connections. Numerous other graph-mapped applications 103 may use graphs 104 in a practically unlimited number of ways. Graph 104 may be a directed graph, an undirected graph, a cyclic graph, a directed acyclic graph, a singly-connected graph, a multi-connected graph, a weighted graph, a node-labeled graph, a vertex-labeled graph, or any other suitable type of graph.

Developer's server 101 may further host (e.g., store) a table-based graph representation 106, which may be any table, map, hash table (hash map), image, chart, etc., that identifies nodes and edges of graph 104. In particular, table-based graph representation 106 may list each specific node of graph 106 in association with other nodes connected to the specific node, such that edges of graph 106 are stored implicitly, as nodal connections of explicitly listed nodes. In some embodiments, table-based graph representation 106 may list each specific edge of graph 106 in association with nodes that these edge connect, such that nodes of graph 106 are stored implicitly, as objects associated with the respective edges. In some embodiments, table-based graph representation 106 may explicitly list nodes of graph 106 in association with connecting edges and may further explicitly list edges of graph 106 in association with the respective nodes. In some embodiments, graph 106 may be indexed by nodes, by edges, or by a combination of nodes and edges. Each node may be stored in further association with node attributes and each edge may be stored in further association with edge attributes. For example, a node attribute may be a description of a geographic location in a map, a description of a person in an organizational chart, a run command for a software resource, and so on. An edge attribute may be a description of a road connecting two geographic locations, a description of a supervisor-worker relationship, a condition to be satisfied for data to be routed along a corresponding connection, and so on. In some embodiments, table-based graph representation 106 may be a large table, map, or any other data structure that has hundreds of thousands or millions (or even more) entries.

Graph optimization server 120 may be any computing device that has access to stored graph-mapped application 103 and table-based graph representation 106. Graph optimization server 120 may be capable of performing one or more grid-based optimizations, according to at least some embodiments of the present disclosure. Graph optimization server 120 may include a grid generation engine (GGE) 122 and a grid optimization engine (GOE) 124. GGE 122 may select an initial grid with a dimensionality (e.g., two-dimensional grid, three-dimensional grid, and so on) and a size that are chosen in view of parameters of table-based graph representation 106, e.g., based on a number of nodes and edges of graph 104. GGE 122 may also assign nodes and edges of graph 104 to the selected grid. GOE 124 may then modify the grid, e.g., by adding dummy nodes and dummy connections, compactifying the grid, e.g., by moving nodes in the grid, reducing the size of the grid, and the like. An output of GOE 124 may be a grid-based graph representation 126 that represents graph 104 is a more efficient manner than table-based graph representation 106.

Grid-based representation 126 may be stored in data repository 170, which may further store graph-mapped application 103 that uses graph 104. In some embodiments, data repository 170 may further store table-based graph representation 106. Data repository 170 may be a persistent storage capable of storing images as well as metadata for the stored images. Data repository 170 may be hosted by one or more storage devices, such as main memory, magnetic or optical storage based disks, tapes or hard drives, NAS, SAN, and so forth. Although depicted as separate from developer's server 101 and graph optimization server 120, in at least one embodiment data repository 170 may be a part of developer's server 101 and/or graph optimization server 120. In at least some embodiments, data repository 170 may be a network-attached file server, while in other embodiments data repository 170 may be some other type of persistent storage such as an object-oriented database, a relational database, and so forth, that may be hosted by a server machine or one or more different machines coupled to developer's server 101 and/or graph optimization server 120 via network 140.

Graph-mapped application 103 and grid-based graph representation 126 may be accessed by (and/or stored on) an application server 150, which may provision graph-mapped application 103 to one or more client devices 160. In some embodiments, application server 150 may be a part of cloud-based services provisioned to multiple remote client devices. Application server 150 may be capable of using grid-based graph representation 126 in a variety of ways. For example, application server 150 may perform graph traversal 152 (which may be responsive to a request from client device 160). Graph traversal 152 may include visiting all nodes of the graph or a subset of nodes that satisfy a specific condition. Graph traversal 152 may also include finding an optimal path (e.g., the shortest path or a path that minimizes a suitable cost function) between two (or more) nodes of the graph. Graph traversal 152 may also include finding singly-connected clusters (sub-graphs) of the graph, finding a subset of nodes satisfying a certain condition (e.g., all points of interest on a city map within a certain driving time), and so on. In some instances, application server 150 may perform a graph reconstruction 154 from grid-based graph representation 126, to restore table-based graph representation 106. This capability may eliminate the need to store table-based graph representation 106 on application server 150 or to retrieve table-based graph representation 106 from data repository 170 or developer's server 101. As described in more detail below, grid-based graph representation 126 may be lossless and may, therefore, be used for full reconstruction of table-based graph representation 106.

In some embodiments, client device 160 may operate graph-mapped application 103 fully as a cloud-hosted service, e.g., using application server 150. In some embodiments, client device 160 may operate graph-mapped application 103 with grid-based graph representation 126 downloaded and operated locally, as illustrated by the dashed boxes in FIG. 1A.

It should be understood that example computing architecture 100 of FIG. 1A is intended as an illustration and that numerous variations of example computing architecture 100 are within the scope of the present disclosure. In some embodiments, any or all of developer's server 101, graph optimization server 120, an application server 150, client device 160, and/or data repository 170 may be implemented on a single device. For example, graph optimization server 120 may be implemented on application server 150 and/or on client device 160.

Figure 1B:
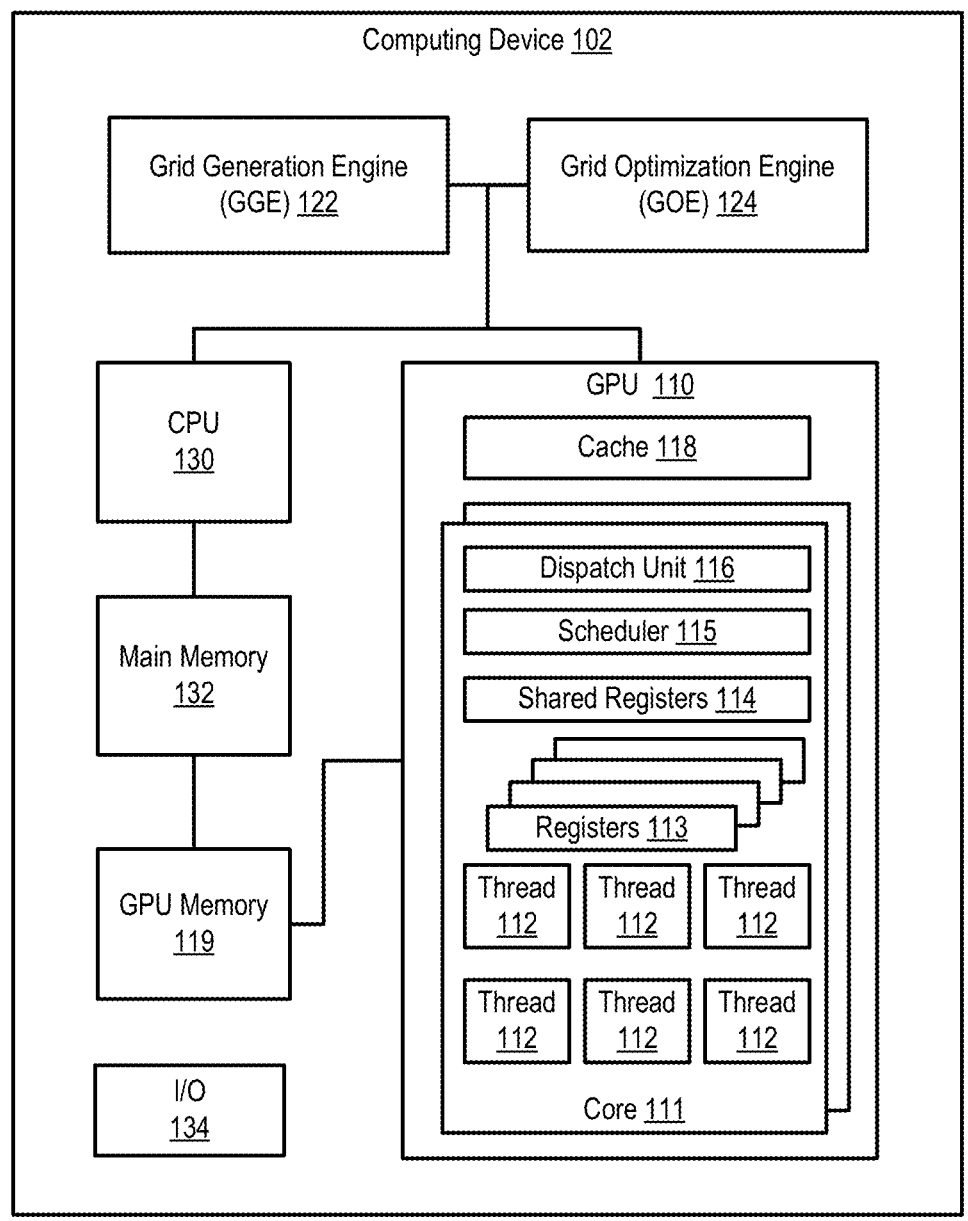
FIG. 1B is an example computing device that may be used in generating and deploying grid-based graph representations for efficient implementations of graph-mapped computing applications, in accordance with at least some embodiments.

FIG. 1B is an example computing device 102 that may be used in generating and deploying grid-based graph representations for efficient implementations of graph-mapped computing applications, in accordance with at least some embodiments. In at least one embodiment, computing device 102 may be application server 150. In at least one embodiment, computing device 102 may be developer's server 101 and/or client device 160. Computing device 102 may be implementing one or more tasks and processes that facilitate generation of grid-based representations and deployment of grid-based representations to support applications that use graphs. In some embodiments, tasks/processes implemented by computing device 102 may be executed by one or more GPUs 110 and/or CPUs 130. In at least one embodiment, GPU 110 includes multiple cores 111, each core being capable of executing multiple threads 112. Each core may run multiple threads 112 concurrently (e.g., in parallel). In at least one embodiment, threads 112 may have access to registers 113. Registers 113 may be thread-specific registers with access to a register restricted to a respective thread. Shared registers 114 may be accessed by multiple (e.g., all) threads of the core. In at least one embodiment, each core 111 may include a scheduler 115 to distribute computational tasks and processes among different threads 112 of core 111. A dispatch unit 116 may implement scheduled tasks and sub-tasks on appropriate threads using private registers 113 and shared registers 114. Computing device 102 may include input/output component(s) 134 to facilitate exchange of information with one or more users or developers.

In at least one embodiment, GPU 110 may have a (high-speed) cache 118, access to which may be shared among multiple cores 111. Furthermore, computing device 102 may include a GPU memory 119 where GPU 110 may store intermediate and/or final results (output) of computations performed by GPU 110. After completion of a particular task, GPU 110 (or CPU 130) may move the output to (main) memory 132. Referring to both FIG. 1A and FIG. 1, in at least one embodiment, GGE 122 and/or GOE 124 may assign, for execution, to CPU 130 one or more sub-tasks that involve serial computations and to GPU 110 one or more sub-tasks that are amenable to parallel processing. For example, operations such as (for example and without limitation): assignment of nodes to a grid, adding dummy nodes, and compactifying the grid may be performed by CPU 130, whereas encoding a grid-based graph representation 126 based on the compactified grid may be performed by GPU 110. In at least one embodiment, GGE 122 and/or GOE 124 may assign one or more tasks and/or processes without specifying how the assigned sub-tasks are to be performed by resources of computing device 102. Respectively, a processing device (e.g., CPU 130) of computing device 102 may determine which parts of the assigned tasks and/or processes are to be executed on GPU 110 and which parts are to be executed on CPU 130.

Figure 2A:
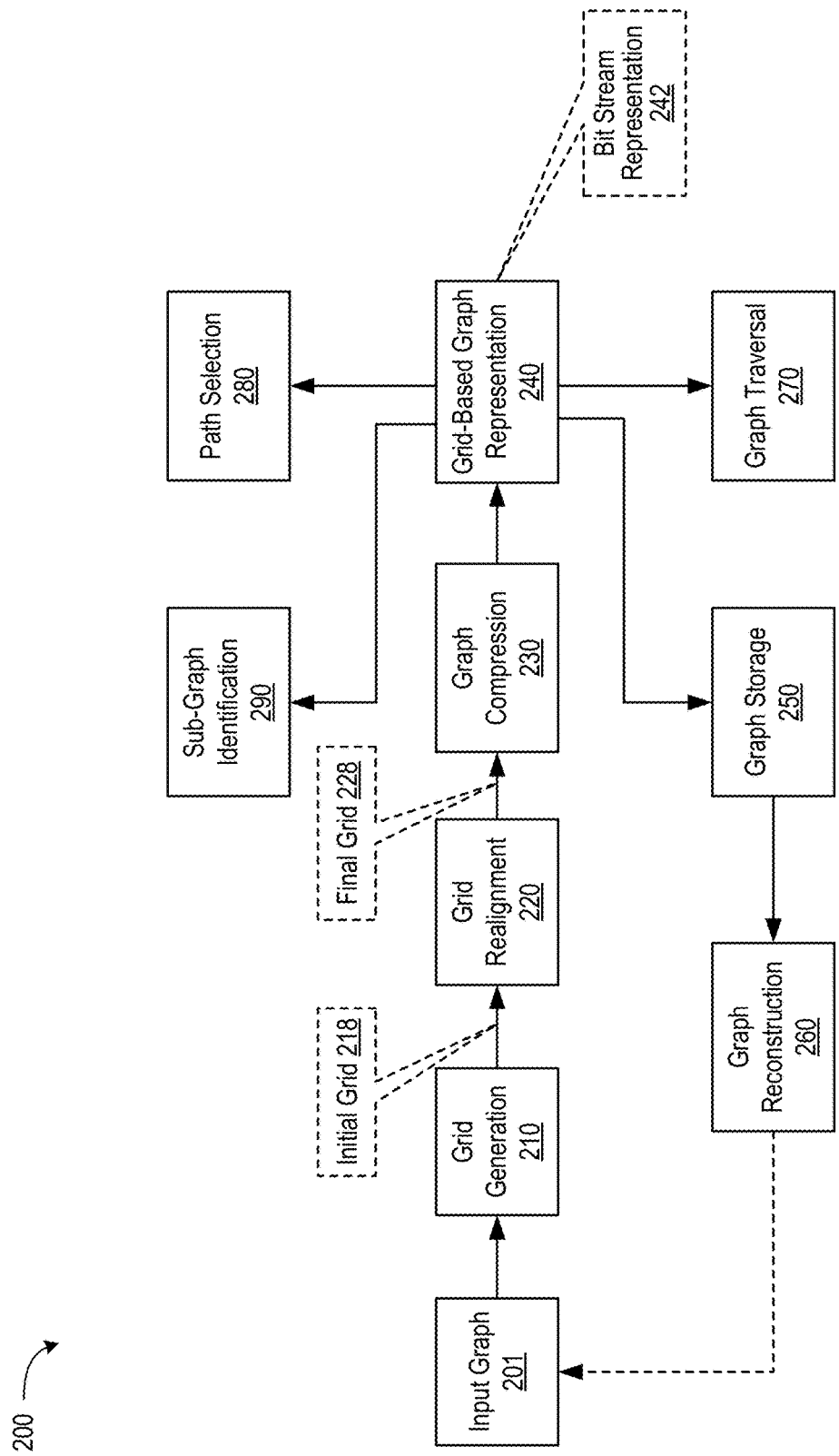
FIG. 2A illustrates example operations performed in the course of generating and using grid-based graph representations for efficient implementations of graph-mapped computing applications, according to at least one embodiment.

FIG. 2A illustrates example operations 200 performed in the course of generating and using grid-based graph representations for efficient implementations of graph-mapped computing applications, according to at least one embodiment. In some embodiments, example operations 200 may be performed by graph optimization server 120 of FIG. 1A. As shown in FIG. 2A, example operations 200 may be directed to obtaining an efficient and compact grid-based representation 240 of an input graph 201. Input graph 201 may be represented in any suitable format, e.g., as a hash table or hash map, an image, an adjacency matrix, an adjacency list, an incidence matrix, a flowchart, and so on. Input graph 201 may be retrieved from memory of graph optimization server 120 or may be received over network, e.g., from developer's server 101 or data repository 170 of FIG. 1A. Grid generation 210 may include one or more functions that generate, based on input graph 201, an initial grid 218. Subsequently, grid realignment 220 may transform initial grid 218 into a final grid 228 suitable for efficient, compact, and reversible representation of input graph 201. In some embodiments, grid generation 210 may be performed by GGE 122 and grid realignment 220 may be performed by GOE 124 of FIG. 1A.

Figure 2B:
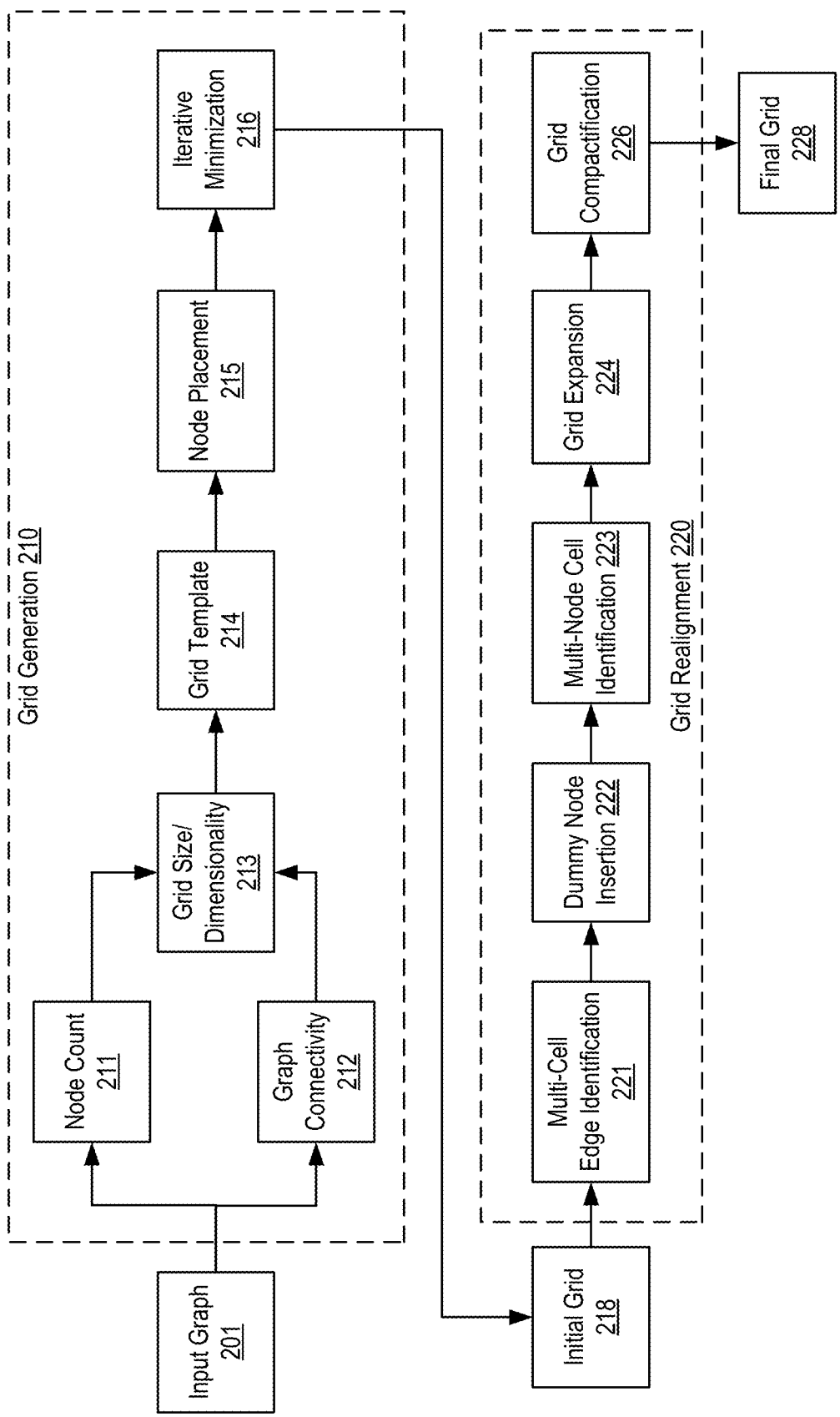
FIG. 2B illustrates example operations of grid generation and grid realignment modules of FIG. 2A, according to at least one embodiment.

FIG. 2B illustrates example operations of grid generation 210 and grid realignment 220 modules of FIG. 2A, according to at least one embodiment. As illustrated in FIG. 2B, grid generation 210 may analyze a node count 211 and graph connectivity 212 of input graph 201 and identify size/dimensionality 213 of a grid template 214 to be used for representing input graph 201. "Dimensionality" refers to a number of spatial coordinates used for identifying points or cells of grid template 214, e.g., two-dimensional (2D) grid, three-dimensional (3D) grid, . . . n-dimensional (nD) grid. "Size" refers to a number of elemental cells of grid template 214 along various dimensions of the grid. For example a 2D grid (dimensionality 2) of 1024×512 size may have 1024 cells (e.g., squares) along a first dimension (x-axis) and 512 cells along the second (y-axis) dimension. As another example, a 3D graph (dimensionality 3) of 256×256×64 size may have 256 cells (e.g., cubes) along both the first dimension (x-axis) and the second (y-axis) dimension and 64 cells along the third (z-axis) dimension. In some embodiments, grid template 214 selected by grid generation 210 may be a grid of square (or cubic) cells, as in the above example(s). In some embodiments, grid template 214 may be some other suitable grid, e.g., a triangular grid, a hexagonal grid, and so on.

In some embodiments, grid size/dimensionality 213 of grid template 214 may be determined based on a total number of nodes in input graph 201, a total number of edges in input graph 201, an average number of edges per node, a maximum number of edges per node, or any other metric characterizing input graph 201. Grid size may be selected to be at least the number of nodes in input graph 201. For example, if the number of nodes is 183500, grid generation 210 may select a square 2D grid template 214 of size 512×512 cells or a cubic 3D grid of size 64×64×64 cells, or an asymmetric 3D grid of 128×128×16 cells (262144 total cells in all three examples). Selecting from different grid dimensionalities of grid template 214 may be performed based on an average (or maximum) number of edges connecting various nodes of input graph 201. For example, if the average (or maximum) number of edges per node of input graph 201 is less than $2^D-1$ (the number of cells adjacent to a given cell of a D-dimensional grid, e.g., 8 in case of a 2D square grid, 26 in case of a 3D cubic grid, and so on), but more than $2^{D-1}-1$, the dimensionality of selected grid template 214 may be D. Various other schemes of selecting grid size/dimensionality 213 are within the scope of the present disclosure.

Having selected grid template 214, grid generation 210 may perform initial node placement 215 of various nodes of input graph 201 on grid template 214. Additional iterative minimization 216 may further be performed to obtain initial grid 218. Iterative minimization 216 may include rearranging the initial placement of the nodes, e.g., to reduce the length (in grid cells) of various nodal connections (edge lengths). Iterative minimization 216 may be performed by adjusting a position of a specific node in a way that reduces edge lengths between at least some of the nodes, and continuing the same procedure for other nodes to crawl across the whole grid.

Grid realignment 220 may transform initial grid 218 into a final grid 228 that satisfies a set of grid rules. A set of grid rules may be designed in a way that results in a grid-based graph representation 240 that compactly and efficiently maps input graph 201. In one non-limiting example, grid rules may be as follows. Rule 1 may prescribe that at most one node of input graph 201 may be assigned to a grid cell. Rule 2 may prescribe that an edge connecting two nodes may extend between adjacent cells (nearest neighbor cells) but not between cells that lack a common boundary or at least an edge (vertex). To ensure that final grid 228 is compliant with the set of grid rules, grid realignment 220 may perform multi-cell edge identification 221 to identify long edges connecting cells that are not nearest neighbors. Dummy node insertion 222 may introduce additional (dummy) nodes to split long edges into edges that extend over adjacent cells, to comply with Rule 2 (as illustrated in more detail below). Some of the inserted dummy nodes may be placed into cells already occupied by nodes, resulting in a situation that violates Rule 1. Multi-node cell identification 223 may identify such cells/nodes. Grid expansion 224 may then insert additional rows and/or columns into the grid to move apart nodes residing in multi-node cells. After ensuring compliance of the grid with the set of rules (e.g., both Rule 1 and Rule 2), grid realignment 220 may include an operation of grid compactification 226 to reduce the size of final grid 228. Grid compactification 226 may include removing unnecessary dummy nodes, shifting various remaining nodes to reduce the extent of the grid along one or more spatial dimensions, and so on.

With a continued reference to FIG. 2A, final grid 228 optimized by grid realignment 220 may be used for graph compression 230, which may include one or more operations that map input graph 201 to final grid 228 to obtain a compact grid-based graph representation 240. In some embodiments, grid-based graph representation 240 may include a bit stream representation 242 (or a similar representation) that identifies locations of various nodes of input graph 201 with respect to cells of final grid 228 and specifies edges of input graph as directions in final grid 228, e.g., as described in more detail below.

Grid-based graph representation 240 may be used for a variety of tasks. In some embodiments, grid-based graph representation 240 may be stored in any suitable graph storage 250 (e.g., memory of grid optimization server 120, application server 150, client device 160, data repository 170, etc.) or communicated over network 140. Subsequently, the stored compact grid-based graph representation 240 may be retrieved from graph storage 250 and used for graph reconstruction 260 of the original (e.g., hash map) representation of initial graph 201, which may then be used for any task that involves graph-mapped application 103 of FIG. 1A. In some embodiments, grid-based graph representation 240 may be used directly (without graph reconstruction 260) to perform various graph operations. In one example, a graph traversal 270 operation may be performed, which may include visiting any target set of nodes (or all nodes) of input graph 201. In another example, grid-based graph representation 240 may be used to perform a path selection 280, e.g., identifying a path in the input graph 201 between two (or more) nodes obeying some optimization criterion, such as the shortest path, the most economical path (in navigation applications), or some other path that optimizes any suitable cost function. In yet another example, grid-based graph representation 240 may be used to perform a sub-graph identification 290 to segment input graph into one or more sub-graphs (connected clusters).

Figure 3A:
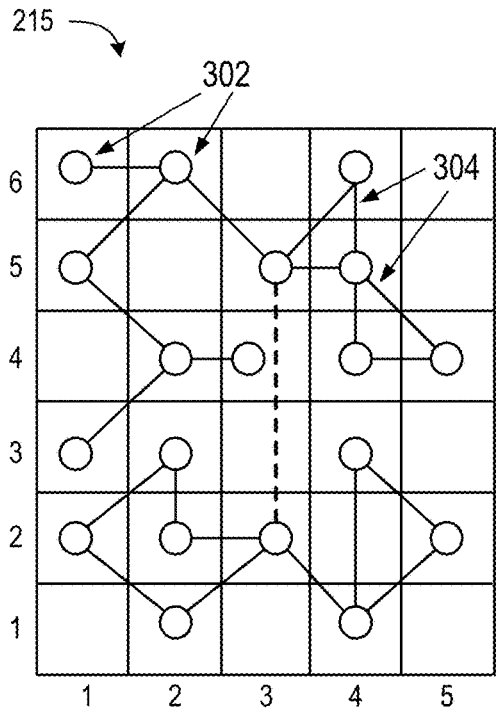
FIGS. 3A-D illustrate operations of grid generation and grid realignment for an example two-dimensional grid, according to at least one embodiment.

FIGS. 3A-D illustrate operations of grid generation 210 and grid realignment 220 for an example 2D grid, according to at least one embodiment. FIG. 3A illustrates node placement 215 of nodes 302 (denoted with white circles) placed into cells (squares) of a rectangular 5×6 grid template 214. Nodes 302 are connected via edges 304 (denoted with lines). It should be understood that such a small grid with a relatively low number of nodes (19 nodes) is depicted only for the ease of viewing and that grids of arbitrarily large size may be deployed to represent graphs with arbitrarily large numbers of nodes. Node placement 215 need not be attempted in a way that fully satisfies all grid rules. In particular, while node placement 215 may place each node in a separate cell, nodes need not be placed (and in many instances cannot be so placed) in a way where all edges are adjacent-cell edges. As illustrated in FIG. 3A, some edges may extend over multiple cells, e.g., the edge indicated with the dashed line extends over three cells (not counting a starting cell), from cell (3, 2) to cell (3, 5), where the notation (x, y) identifies a cell having the horizontal coordinate x and the vertical coordinate y.

Figure 3B:
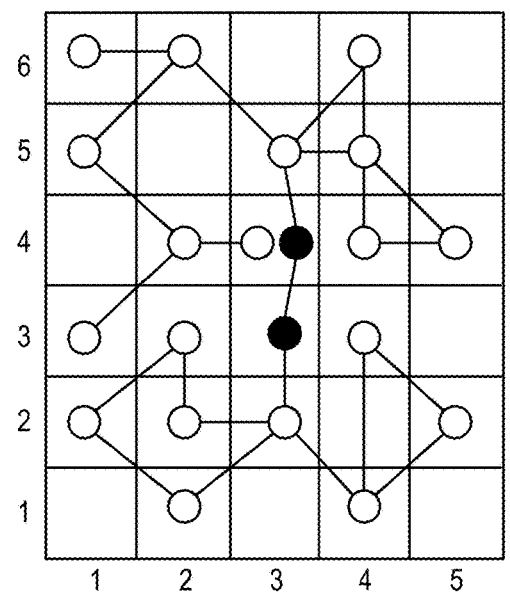
Figure 3C:
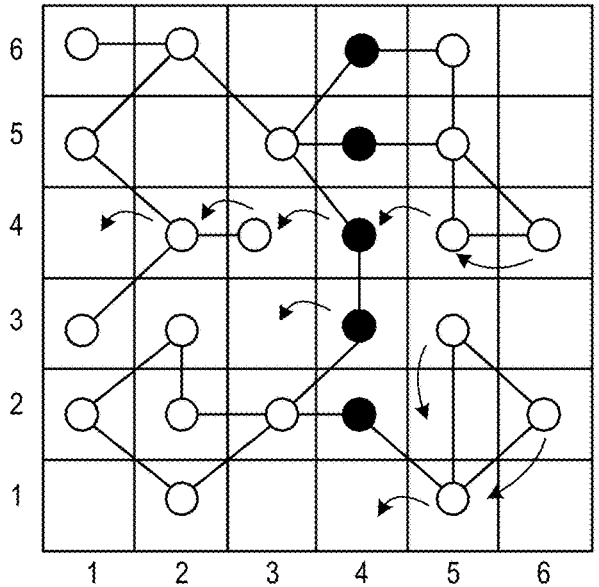

Multi-cell edge identification 221 may then locate all long edges that extend over multiple cells. FIG. 3B illustrates dummy node insertion 222 that introduces dummy nodes (indicated with black circles) to split long (multi-cell) edges into (adjacent-cell) edges that extend over neighbor cells. As depicted in FIG. 3B, the dashed line edge is split into three adjacent-cell edges by placing dummy nodes in cells (3, 3) and (3, 4). As a result of dummy node insertion 222, some of the dummy nodes may end up in cells already occupied by other nodes, e.g., cell (3, 4) is now hosting two nodes. Multi-node cell identification 223 may identify cells hosting two or more nodes. As depicted in FIG. 3C, grid expansion 224 may introduce additional rows and/or columns into the grid to make up space for additional nodes. For example, the column of elements (4, 1) through (4, 6) is added in the course of grid expansion 224. As a result of grid expansion 224, additional nodes may have to be placed to split the edges extended by the insertion of rows/columns. For example, dummy node in cell (4, 2) is inserted to split the edge connecting nodes in cells (3, 2) and (5, 1), dummy node in cell (4, 5) is inserted to split the edge connecting nodes in cells (3, 5) and (5, 5), and dummy node in cell (4, 6) is inserted to split the edge connecting nodes in cells (3, 5) and (5, 6).

Figure 3D:
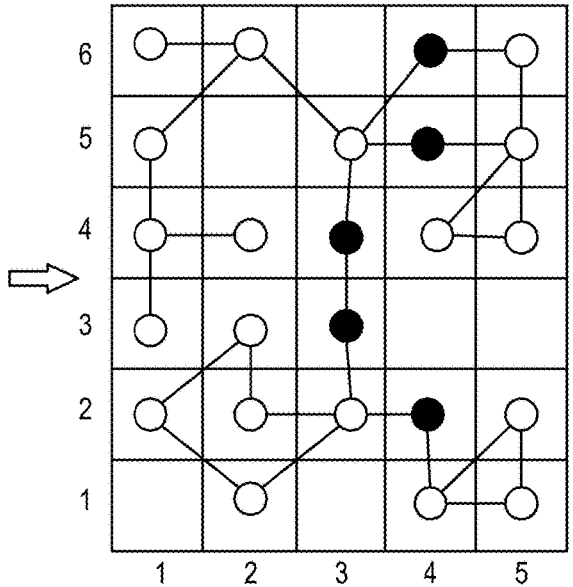

To obtain final grid 228, grid compactification 226 illustrated in FIG. 3D may be implemented to reduce the number of rows and columns. Grid compactification 226 may shift some of the nodes in a way that vacates one or more columns and/or one or more rows, which may then be eliminated from the grid. For example, moving nodes of FIG. 3C (as indicated with arrows) towards the arrangement shown in FIG. 3D, the last column in FIG. 3C may be vacated and then eliminated. Moving nodes and eliminating columns/rows may be performed in a way that preserves compliance with the grid rules, e.g., maintaining the edges as adjacent-cell edges. Although not shown in FIGS. 3C-D, grid compactification 226 may further include removing unnecessary dummy nodes, if such removal may be accomplished without extending edges over multiple cells.

In some embodiments, grid compactification 226 may be performed using a suitable cost function. A cost function may assign a cost $C_N$ to each dummy node and/or a cost $C_C$ to each nodal connection associated with a dummy node, e.g., a connection between a dummy node and a real node or a connection between a dummy node and another dummy node. Grid compactification 226 may be performed by moving various nodes (real or dummy) within the grid, comparing the total cost (e.g., $C=\Sigma C_N + \Sigma C_C$) for various arrangements of the nodes, and selecting arrangements with a lower total cost. In some embodiments, grid compactification 226 may use any suitable greedy algorithm, e.g., an algorithm that rearranges one or more nodes within a limited locale of the grid by reducing the cost function and then moves to an adjacent locale, crawling one or more times over the whole extent of the grid. In some embodiments, additional cost function may be assigned to each empty cell.

Figure 4:
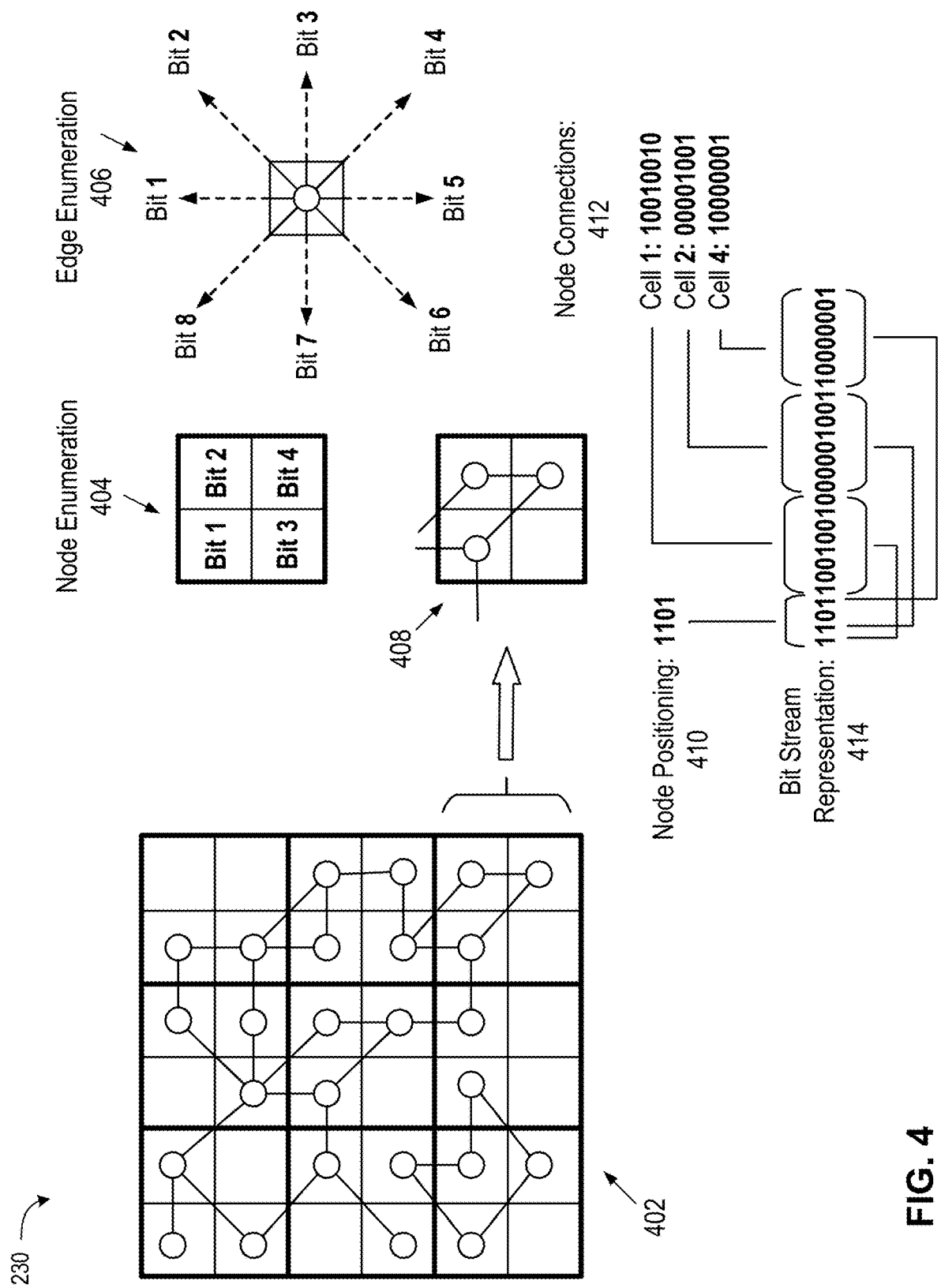
FIG. 4 illustrates one example implementation of graph compression, according to at least one embodiment.

FIG. 4 illustrates one example implementation of graph compression 230, according to at least one embodiment. FIG. 4 illustrates an example final grid 402. Cells of final grid 402 may be grouped into blocks. Although FIG. 4 illustrates final grid 402 grouped into 2×2 blocks of cells, blocks of other sizes, e.g., 3×3 blocks, 2×1 blocks, or blocks having any other number of cells may be used. In those instances where a final grid is not divisible into an integer number of blocks, the final grid may be padded with one or more additional rows and/or columns of cells to an integer number of blocks. Implementing graph compression 230 may include using any suitable scheme of node/edge encoding. In one non-limiting example, node/edge encoding may use a row-wise (or column-wise) format. For example, nodes in a block may be identified using a row-by-row node enumeration 404, each cell of the block is assigned a bit that indicates whether a node is present in a cell (e.g., bit value 1) or not (e.g., bit value 0). In particular, bit 1 of node positioning 410 encoding may indicate whether a node is present in the top-left cell of a block, bit 2 may indicate whether a node is present in the top-right cell of the block, bit 3 may indicate whether a node is present in the bottom-left cell of the block, and bit 4 may indicate whether a node is present in the bottom-right cell of the block. A similar node positioning 410 may be used for 3D grids, e.g., with 8 bits indicating presence or absence of a node in 8 cells of a 2×2×2 block, or, similarly, for any D-dimensional grid, and/or grids whose blocks have more than two cells for various grid dimensions.

Node connections (edges) starting from (or ending at) a given node in a cell may be identified using edge enumeration 406. For example, each direction may be assigned a bit that indicates whether an edge that extends along a respective direction is present (e.g., bit value 1) or not (e.g., bit value 0). In particular, bit 1 of node connections 412 may indicate whether an edge extends up from the node, bit 2 may indicate whether an edge extends diagonally up and right from the node, bit 3 may indicate whether an edge extends directly to the right from the node, and so on, as indicated in FIG. 4. More specifically, cell 1 (the top-left node) of block 408 is characterized by node connections 412 encoded via the following bit sequence: 10010010 indicating that a node in cell 1 has three connections—along the upward direction (bit 1 having value 1), the bottom-and-rightward diagonal direction (bit 4 having value 1), and the leftward direction (bit 7 having value 1). FIG. 4 further shows node connections 412 for the nodes hosted by the other two cells (cell 2 and cell 4) of block 408. Since cell 3 does not have a node, the corresponding node 3 part may be omitted during the encoding of node connections 412. In some embodiments, an opposite (e.g., counterclockwise) enumeration of directions may be used or any other scheme that unambiguously identifies edge directions in relation to the grid. Similar node connections 412 may be used for 3D grids (and, similarly, for any D-dimensional grid), e.g., with 26 bits indicating presence or absence of a connection to a respective node in one of 26 adjacent cells.

Node positioning 410 and node connections 412 for a specific block may be combined into bit stream representation 414. FIG. 4 illustrates bit stream representation 414 for block 408 (e.g., the bottom-right block of final grid 402). The first portion of bit stream representation 414 may be node positioning 410 that indicates which cells of block 408 host nodes and which cells are empty. The first portion serves as a pointer (or key) for the second portion, which includes node connections 412 for the cells/nodes identified by the corresponding bits 1 of the first portion. For example bit stream representation 414 of block 408 may have the form (bits are grouped for the ease of reading):

BSR=1101 10010010 00001001 10000001, where the first group (node positioning 410) of four bits identifies cells ($1^{st}$, $2^{nd}$, and $4^{th}$) that host nodes, the second group of eight bits identify node connections 412 of the node in $1^{st}$ cell, the second group of eight bits identifies node connections of the node in $2^{nd}$ cell, and the fourth group of eight bits identifies node connections of the node in $4^{th}$ cell. The zero value of the third bit of the node positioning 410 signals that the corresponding group of eight bits is omitted. Accordingly, bit stream representation 414 of a 2×2 block of a 2D grid may have at least four bits, if the block has no nodes, and at most 36 bits (4+4×8 bits), if the block has all four nodes. Similarly, bit stream representation 414 of a 2×2×2 block of a 3D grid may have at least eight bits, if the block has no nodes, and at most 216 bits (8+8×26 bits), if the block has eight nodes. Bit stream representations 414 of each block of final grid 402 may then be joined (e.g., concatenated) to obtain bit stream representation 242 of the final grid.

In some embodiments, additional compactification may be achieved by omitting redundant bits of node connections 412 and/or node positioning 410 arising in the context of adjacent blocks/cells. More specifically, value 1 of the $3^{rd}$ bit of node connections 412 for cell 1 of a given block signals that cell 2 of the same block hosts a node and that, therefore, both $2^{nd}$ bit of node positioning 410 and $7^{th}$ bit of node connections 412 for cell 2 have values 1. Similarly, value 1 of $6^{th}$ bit of node connections 412 for cell 2 signals that cell 3 hosts a node and that, therefore, both $3^{rd}$ bit of node positioning 410 and $2^{nd}$ bit of node connections 412 for cell 3 have values 1. Such redundancy in values of different bits may be exploited by omitting, from bit stream representation 242 of the final grid, of the bits whose values unambiguously follow from other bits (e.g., by applying suitable binary masks). Further compression of bit stream representation 242 may be achieved by leveraging, in the similar manner, node connections that extend between neighboring blocks with omitting those bit values that carry information redundant in view of the similar information provided by bit stream representations 414 of the blocks that are above or to the left of a given block (or below and to the right, depending on the order of block encoding).

FIGS. 5A-D illustrate one example implementation of graph operations in which a compressed grid-based representation may be used, according to at least one embodiment. Graph operations 500 may be used in applications that involve graph traversal 270, path selection 280, sub-graph identification 290, or any other applications that explore connectivity of various nodes and regions of a graph. FIG. 5A illustrates a high-level flow of graph operations 500 that identify connections between blocks of a grid (e.g., final grid 228). A computing device performing operations 500 may choose neighbor blocks (operation 510), e.g., a pair of blocks sharing a common side or a common corner. FIG. 5B illustrates two neighbor blocks 560 and 562 sharing a common side. Each of blocks 560 and 562 is a 2×2 block of four cells. Choosing neighbor blocks may be performed according to any suitable algorithm. For example, during a grid traversal or path finding, one of the blocks (e.g., block 560) may be a block hosting a starting node and another block (e.g., block 562) may be a randomly selected adjacent block. The computing device may also select boundary masks (operation 520) for the chosen blocks. Boundary masks may be applied to the blocks to identify boundary regions in each block (operation 530) and facilitate determination of the presence or absence of nodes in boundary regions (operation 540). A boundary mask may have as many bits as there are cells in each block, e.g., four bits $m_1 m_2 m_3 m_4$ for a 2×2 block of a 2D grid. The non-zero bits $m_j$ of the boundary mask identify a subset of cells of the corresponding block adjacent to the boundary with the neighbor block and referred to herein as a boundary region (depicted with shading in FIGS. 5B-D). Selected boundary masks depend on the relative orientation of the neighbor blocks. For example, the boundary mask for block 560 of FIG. 5B is $m_1 m_2 m_3 m_4$=0101 and is indicative of the boundary region 561 including cells 2 and 4 of block 560. Similarly, the boundary mask of block 562 is $m_1 m_2 m_3 m_4$=1010 and is indicative of the boundary region 563 including cells 1 and 3 of block 562. Further examples of neighbor blocks are shown in FIG. 5C and FIG. 5D. In particular, FIG. 5C depicts block 570 located directly above block 572. The boundary mask of block 570 is $m_1 m_2 m_3 m_4$=0011 (boundary region 571 includes cells 3 and 4) and the boundary mask of block 572 is $m_1 m_2 m_3 m_4$=1100 (boundary region 573 includes cells 1 and 2). FIG. 5D depicts blocks 580 located diagonally above block 582. The boundary mask of block 580 is $m_1 m_2 m_3 m_4$=0001 (boundary region 581 includes cell 4) and the boundary mask of block 582 is $m_1 m_2 m_3 m_4$=1000 (boundary region 583 includes cell 1).

Boundary mask $m_1 m_2 m_3 m_4$ may be applied to a node positioning encoding $n_1 n_2 n_3 n_4$, e.g., node positioning 410 of FIG. 4, for the respective block using a bitwise AND operation (&) to generate a boundary node indicator (e.g., $b_1b_2b_3b_4$) for the block, $$b_1b_2b_3b_4 = m_1m_2m_3m_4 \& n_1n_2n_3n_4.$$

The boundary node indicator has bit value $b_j=0$ in the positions of cells of non-boundary regions and those boundary cells that have no nodes. On the other hand, each cell in a boundary region that hosts a node is indicated by bit value $b_j=1$.

In the instances of a side boundary (e.g., as in the examples of FIG. 5B and FIG. 5C), the bit values $b_j$ of the two nodes in the boundary may undergo OR operation to generate an active boundary indicator a. For example, for block 560, the active boundary indicator may be $$a = b_2 \text{ OR } b_4.$$

Similarly, the active boundary indicator for block 562 may be $a' = b_1' \text{ OR } b_3'$ (where the primed values refer to block 562). An active boundary indicator with value $a=1$ indicates that the corresponding block has at least one node that could be potentially connected to at least one node of the neighbor block.

Active boundary indicators of the two blocks may then be added together using the AND addition to obtain a connection indicator $$c = a \text{ AND } a'.$$

The connection indicator having value $c=1$ indicates that each of the pair of neighbor blocks has at least one node in the boundary regions and is, therefore, capable of sharing a common connection. Conversely, the connection indicator having value $c=0$ indicates that at least one of the pair of neighbor blocks has no nodes in the boundary region and, therefore, no common connection can exist between the two blocks. Correspondingly, if it is determined (at operation 540 of FIG. 5A) that $c=0$, graph operations 500 may continue with choosing, at operation 510, a new pair of blocks (a pair in which one or both blocks are new) and repeating operations 520-540 for the new pair of blocks.

If it is determined, at operation 540, that $c=1$, graph operations 500 may continue with analyzing the connectivity of the nodes in the boundary regions of the two blocks (operation 550). In some embodiments, operation 550 may include using the boundary node indicator $b_1b_2b_3b_4$ to identify one or more boundary cells associated with bit value $b_j=1$. Operation 550 may further include accessing node connections 412 of the neighboring blocks (e.g., at least one of the blocks) and identifying bit values associated with the connections that extend from the boundary nodes of one of the blocks towards the nodes of the other block. For example, if $b_2=1$ for block 560, operation 550 may access node connections 412 associated with node 2 (the top-right node) of block 560 and determine whether at least one of bit 3 or bit 4 (see edge enumeration 406 in FIG. 4) has bit value 1. Similarly, if $b_4=1$ for block 560, operation 550 may access node connections 412 associated with node 4 (the top-down node) of block 560 and determine whether at least one of bit 2 or bit 3 has bit value 1. If at least one of the accessed bits has value 1, blocks 560 and 562 are connected.

If no connections between the neighbor blocks are found (e.g., the boundary node(s) of a first block of the pair have no connections, have only a mutual connection, have only connection(s) with other nodes of the first block, or have connection(s) to block(s) different from the second block of the pair), operation 550 is concluded with the determination that the neighbor blocks are disconnected, and the flow returns to operation 510 for selection of new block(s). If at least one connection between the blocks is found, the neighbor blocks may be added to the same path or to the same cluster (sub-graph) of blocks, evaluated for inclusion into an optimal path, or may undergo any other suitable actions, in accordance with the specific graph-mapped application being executed. After the connection(s) between the blocks have been evaluated, the flow may return to operation 510 for selection of new block(s) until all blocks of the grid have been processed.

Similar operations may be performed to identify connections between diagonal neighbor blocks, e.g., block 580 and block 582 in FIG. 5D. Because boundary masks $m_1m_2m_3m_4$ for diagonal neighbors include a single bit 1 (e.g., $m_1m_2m_3m_4=0001$ for block 580 and $m_1m_2m_3m_4=1000$ for block 582), connection indicator c may be computed directly from the boundary node indicators for each block, e.g., $$c = b_4 \text{ AND } b_1',$$

where $b_4$ is bit 4 of the boundary node indicator of block 580 and $b_1'$ is bit 1 of the boundary node indicator of block 582. Similar operations may be performed for blocks of any size other than 2×2, e.g., 3×3 blocks, 4×4 blocks, etc. In such instances, active boundary indicators may be computed using sequential OR operations $$a = b_I \text{ OR } b_{II} \text{ OR } b_{III}.$$

where $b_I$, $b_{II}$, $b_{III}$ ... are boundary node indicators for the boundary nodes of the corresponding block (for side-by-side neighbors). The connection indicator c is then obtained by adding (using AND addition) of the boundary indicators of the two blocks, substantially as described above in conjunction with 2×2 blocks. (In the case of diagonal neighbors, the connection indicator is obtained directly by applying AND addition to single-bit boundary node indicators of the two blocks, as described above for the case of 2×2 blocks.)

Operations with higher-dimensional grids may be performed similarly, with the difference that boundary regions for side-by-side 2×2×2 cube neighbors have four cells, boundary regions for cube neighbors that share a rib have two cells, and boundary regions for cube neighbors that share a vertex have one cell. Masks $m_1 \ldots m_8$ and boundary indicators $b_1 \ldots b_e$ are now 8-bit long, and active boundary indicators a are obtained by applying three consecutive AND operations to four bits of the boundary indicators for side-by-side neighbors, two bits of the boundary indicators for neighbors that share a rib, or are given by a single-bit boundary indicator for neighbors that share a vertex. Operations 540 and 550 may then be performed substantially as described above, e.g., by obtaining the connection indicator $c = a \text{ AND } a'$ and choosing a new pair, if $c=0$, or analyzing the connectivity of the boundary regions, if $c=1$.

It should be understood that computational operations described in conjunction with FIGS. 5A-D are intended as one illustration of a use of compressed grid-based representations and that equivalent (or similar) functionality may be achieved by applying a different set of computational operations to node positioning 410 and node connections 412 bit stream encodings.

Graph operations described in conjunction with FIGS. 5A-D result in segmentation of the grid into clusters of blocks having no external connections (e.g., no edges connecting separate clusters). Additional segmentation of clusters of blocks into clusters of nodes may be performed by accessing node connections 412 for blocks within each cluster. For example, a cluster of nodes may be confined within a single block or within multiple blocks of a cluster of blocks. In some instances, a boundary of a cluster of nodes may coincide (for at least a portion of its length) with a boundary of one or more blocks. In some instances, a boundary of a cluster of nodes may pass (for at least a portion of its length) inside a particular block, e.g., with one or two nodes of a 2×2 block belonging to one cluster of nodes and three or two nodes of the same block belonging to another cluster of nodes. All such instances may be identified directly within bit stream representation of the graph, without reconstruction of the graph to the original (e.g., table or map-based) representation.

Figure 6A:
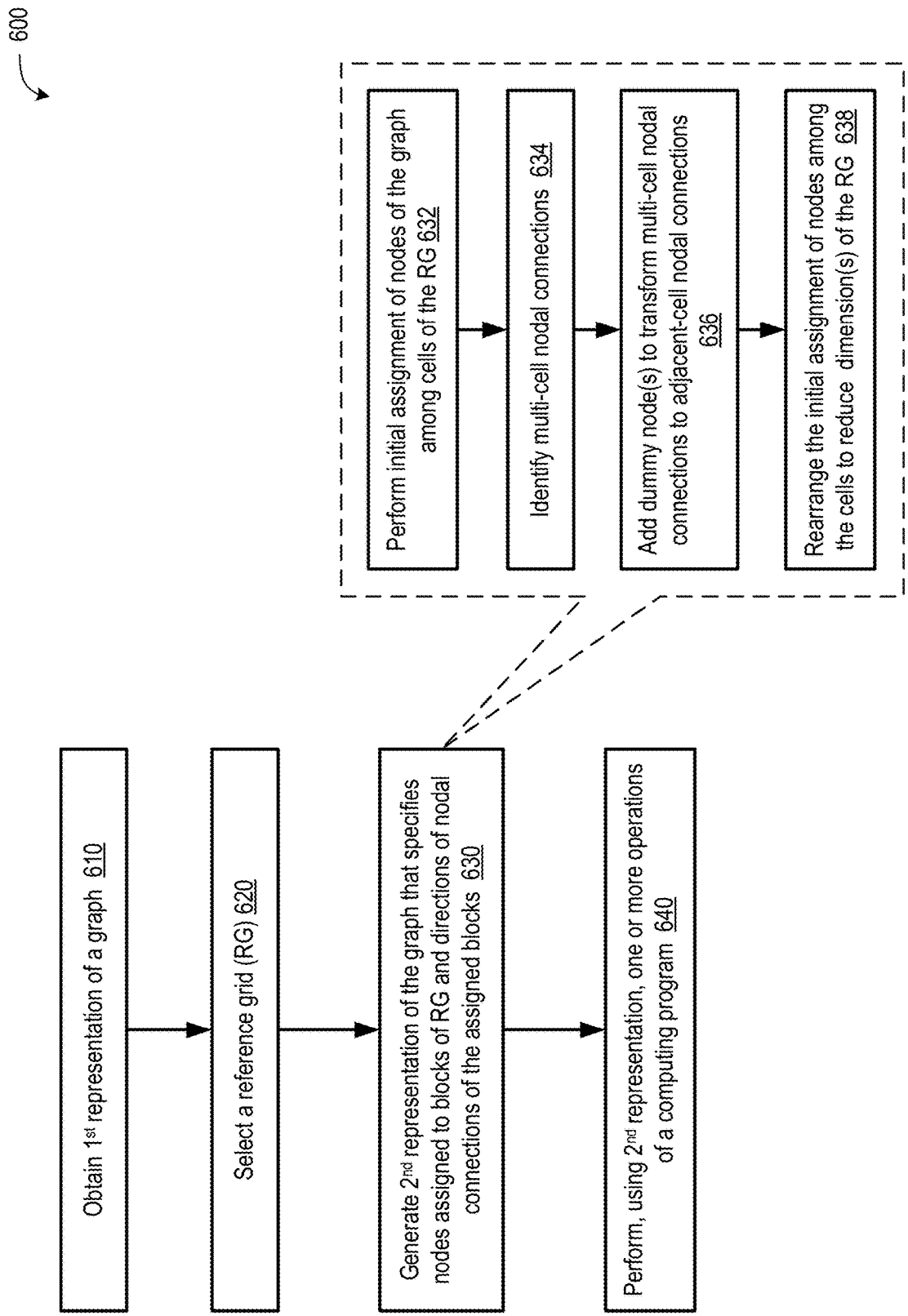
FIGS. 6A-B are flow diagrams of an example method of generating and using grid-based graph representations for efficient implementations of graph-mapped computing applications, according to at least one embodiment.
Figure 6B:
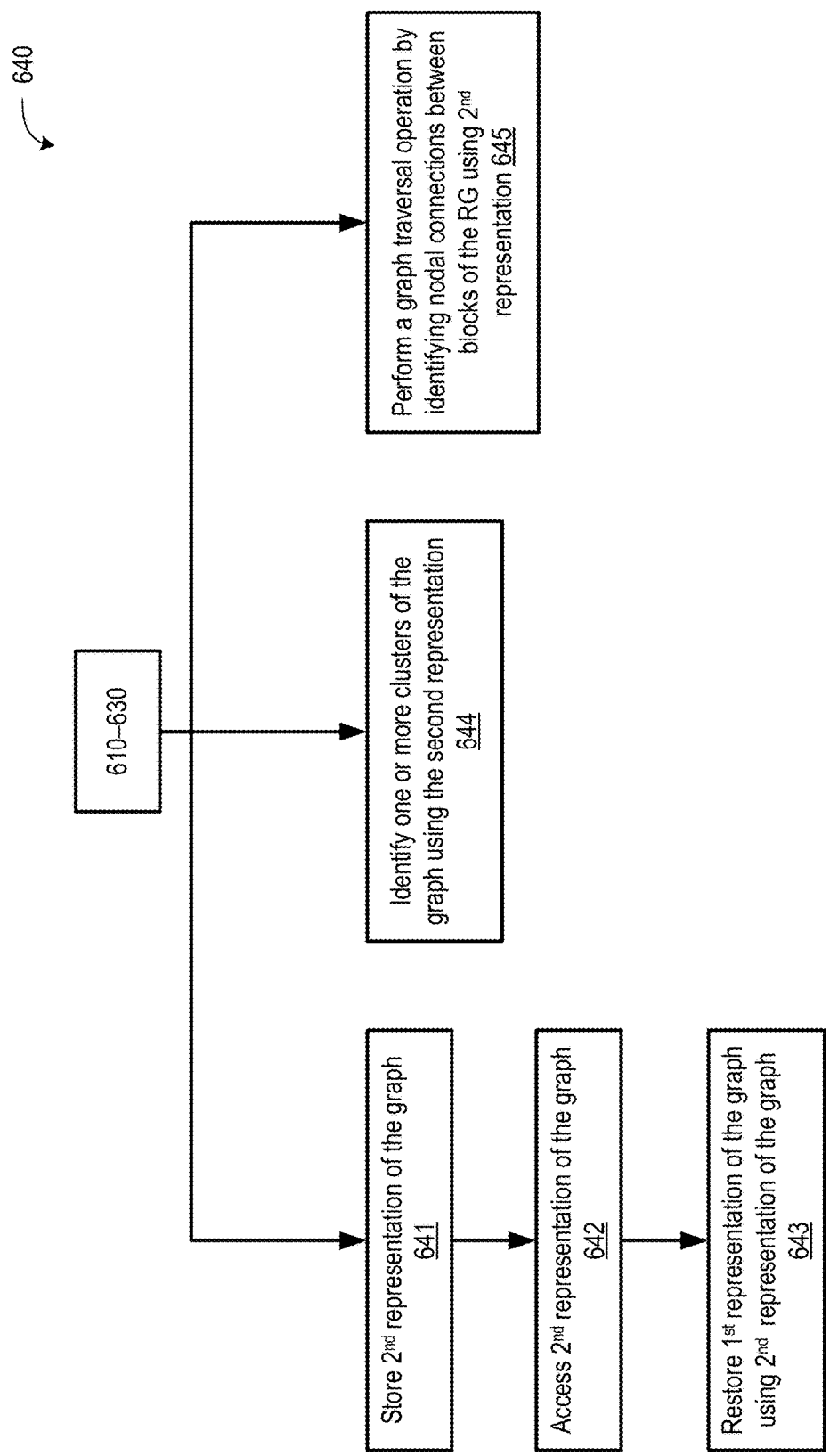

FIGS. 6A-B are flow diagrams of an example method 600 of generating and using grid-based graph representations for efficient implementations of graph-mapped computing applications, according to at least one embodiment. In at least one embodiment, method 600 may be performed by one or more processing units (e.g., CPUs and/or GPUs) of grid optimization server 120, application server 150, client devices 160, or some other computing machine. In at least one embodiment, method 600 of FIGS. 6A-B may be performed by a computing device 102 depicted in FIG. 1B, which may include one or more CPUs 130, GPUs 110, and one or more memory devices, such as registers 113, shared registers 114, cache 118, GPU memory 119, main memory 132, and so on. In at least one embodiment, method 600 may be performed by multiple processing threads (e.g., CPU or GPU threads), each thread executing one or more individual functions, routines, subroutines, or operations of the method. In at least one embodiment, processing threads implementing method 600 may be synchronized (e.g., using semaphores, critical sections, and/or other thread synchronization mechanisms). Alternatively, processing threads implementing method 600 may be executed asynchronously with respect to each other. Various operations of method 600 may be performed in a different order compared with the order shown in FIGS. 6A-B. Some operations of the methods may be performed concurrently with other operations. In at least one embodiment, one or more operations shown in FIGS. 6A-B may not always be performed.

In some embodiments, the processing units performing method 600 may be included in at least one of the following: a control system for an autonomous or semi-autonomous machine; a perception system for an autonomous or semi-autonomous machine; a system for executing one or more real-time streaming applications; a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for performing conversational artificial intelligence operations; a system for generating synthetic data; a system incorporating one or more virtual machines (VMs); a system implemented at least partially in a data center; or a system implemented, at least partially, using cloud computing resources.

Method 600 may be performed as part of distributed computing, medical diagnostics, navigation application, database maintenance and use, provisioning of social networks, provisioning of cloud services having multiple user-accessible resources, and any other suitable computing application or program that uses graphs to map any entities associated with the computing application or program, including but not limited to: hardware computing resources, processors, CPUs, GPUs, field-programmable gate arrays (FPGAs), application-specific integrated circuits (ASICs), memory devices, input-output devices, graphics user interfaces, network interfaces and network controllers, software and/or firmware computing resources, codes, libraries, processes, application programming interfaces, drivers, computer and video games, database entries, business records, medical records, organs of a patient, geographic locations, industrial procedures, standard operating procedures, emergency procedures, workflows, manuals, textbooks, resources of cloud services, users of social networks, real estate assets, warehouse inventory, and any other entities having any physical connections, communication connections, logical associations, contextual associations, temporal associations, spatial associations, and the like.

Processing units performing method 600 may obtain, at operation 610, using a first memory device, a first representation of a graph. The graph may map a plurality of entities associated with a computing program. The first representation may identify a plurality of nodes of the graph. A node of the graph may represent one or more entities of the plurality of entities. The first representation may further identify a plurality of nodal connections of the graph. A nodal connection may represent any relation or association between entities mapped by the graph. In some embodiments, the first representation of the graph may include a hash map (or table), wherein the hash map (table) identifies the plurality of nodes of the graph and the plurality of nodal connections of the graph (e.g., may be a table-based graph representation 106 of FIG. 1A). In some embodiments, the first representation may be permanently stored in the first memory device and may be obtained through a memory access to the first memory device. In some embodiments, the first representation may be received over a network while the first memory device (e.g., a buffer) stores the received first representation transiently.

At operation 620, the processing units performing method 600 may select, using the first representation, a reference grid. The reference grid may include a two-dimensional grid of blocks, a three-dimensional grid of blocks, or a grid of blocks of any higher dimensions. A block may include one or more cells, a cell being the smallest element of the reference grid (e.g., as illustrated in FIG. 4). A number of blocks in the reference grid along any one dimension of the grid need not be equal to a number of blocks along any other dimension of the grid. In some embodiments, selecting the reference grid may include selecting a dimensionality of the reference grid based at least in part on a number of nodes of the plurality of nodes of the graph. In some embodiments, selecting the dimensionality of the reference grid may be further based on a number of nodal connections of the plurality of nodal connections of the graph. In particular, higher-dimensional reference grids may be used with more densely connected grids. For example, a two-dimensional reference grid may be used to represent graphs in which a node, on average, has two or three connections, and a three-dimensional reference grid may be used to represent graphs in which a node, on average, has six or seven connections.

At operation 630, the processing units performing method 600 may generate a second representation of the graph. The second representation may include, for each block of at least a subset of a plurality of blocks of the reference grid, directions of the nodal connections associated with one or more nodes (of the plurality of nodes of the graph) assigned to a respective block. For example, as illustrated in FIG. 4, the second representation may specify locations of nodes within the reference grid and directions of nodal connections (edges) of the nodes, e.g., in relation to various dimensions (axes) of the reference grid. In some embodiments, the second representation of the graph may include a sequence of bits (e.g., bit stream representation 414) for various blocks of the reference grid. The sequence of bit may include a first portion and a second portion. The first portion of the sequence of bits (e.g., node positioning 410) may identify the one or more nodes assigned to the respective block. The second portion of the sequence of bits (e.g., node connections 412) may identify directions of the nodal connections associated with the one or more nodes assigned to the respective block. In some embodiments, generating the second representation of the graph may be performed, at least partially, using a graphics processing unit (GPU), e.g., by encoding the first portions and the second portions of the sequences of bits for various blocks in parallel.

In some embodiments, generating the second representation of the graph may include a number of operations, as illustrated with the callout portion of FIG. 6A. More specifically, at operation 632, method 600 may include performing initial assignment of the plurality of nodes of the graph among a plurality of cells of the reference grid (e.g., as illustrated in FIG. 3A). At operation 634, method 600 may include identifying multi-cell nodal connections (e.g., connections that extend beyond adjacent cells). At block 636, method 600 may continue with adding one or more dummy nodes to transform the multi-cell nodal connections to adjacent-cell nodal connections (e.g., as illustrated in FIG. 3B and FIG. 3C). At block 638, method 600 may include rearranging the initial assignment of the plurality of nodes of the graph among the plurality of cells of the RG to reduce at least one dimension (e.g., length, width, height, etc.) of the reference grid (e.g., as illustrated in FIG. 3D). In some embodiments, locations for the one or more dummy nodes may be determined using a suitable cost function. The cost function may assign a first cost to an added dummy node or a second cost to an added nodal connection associated with the added dummy node.

At operation 640, the processing units performing method 600 may perform, using the second representation, one or more operations of the computing program. Some non-limiting examples of operations 640 are illustrated in FIG. 6B. More specifically, the operations of the computing program may include, at operation 641, storing the second representation of the graph in the first memory device or a second memory device. For example, the first memory device may be a memory device associated with developer's server 101 or data repository 170 (of FIG. 1A) and the second memory device may be a memory device associated with graph optimization server 120. At operation 642, method 600 may include accessing the second representation of the graph at the first memory device or the second memory device and, at operation 643, restoring the first representation of the graph using the second representation of the graph.

At clustering operation 644, method 600 may include identifying, using the second representation, one or more clusters of the graph. Each of the one or more clusters may have no external nodal connections and may include one or more blocks of the plurality of blocks of the reference grid. At operation 645, method 600 may include performing a graph traversal operation for at least a portion of the graph. The graph traversal operation may include identifying at least one nodal connection between a first block of the plurality of blocks of the reference grid and a second block of the plurality of blocks of the reference grid using the sequence of bits (e.g., bit stream representation) of the first block and the sequence of bits of the second block. The clustering operations, optimal path finding operations, and/or graph traversal operations may be performed using any suitable algorithms, e.g. breadth-first searching algorithms, depth-first searching algorithms, or any combination thereof. In some embodiments, only one of the storing operation, the clustering operation, the path finding operation, or the graph traversal operation may be performed. In some embodiments, two or more of the storing operation, the clustering operation, or the graph traversal operation may be performed.

Figure 7:
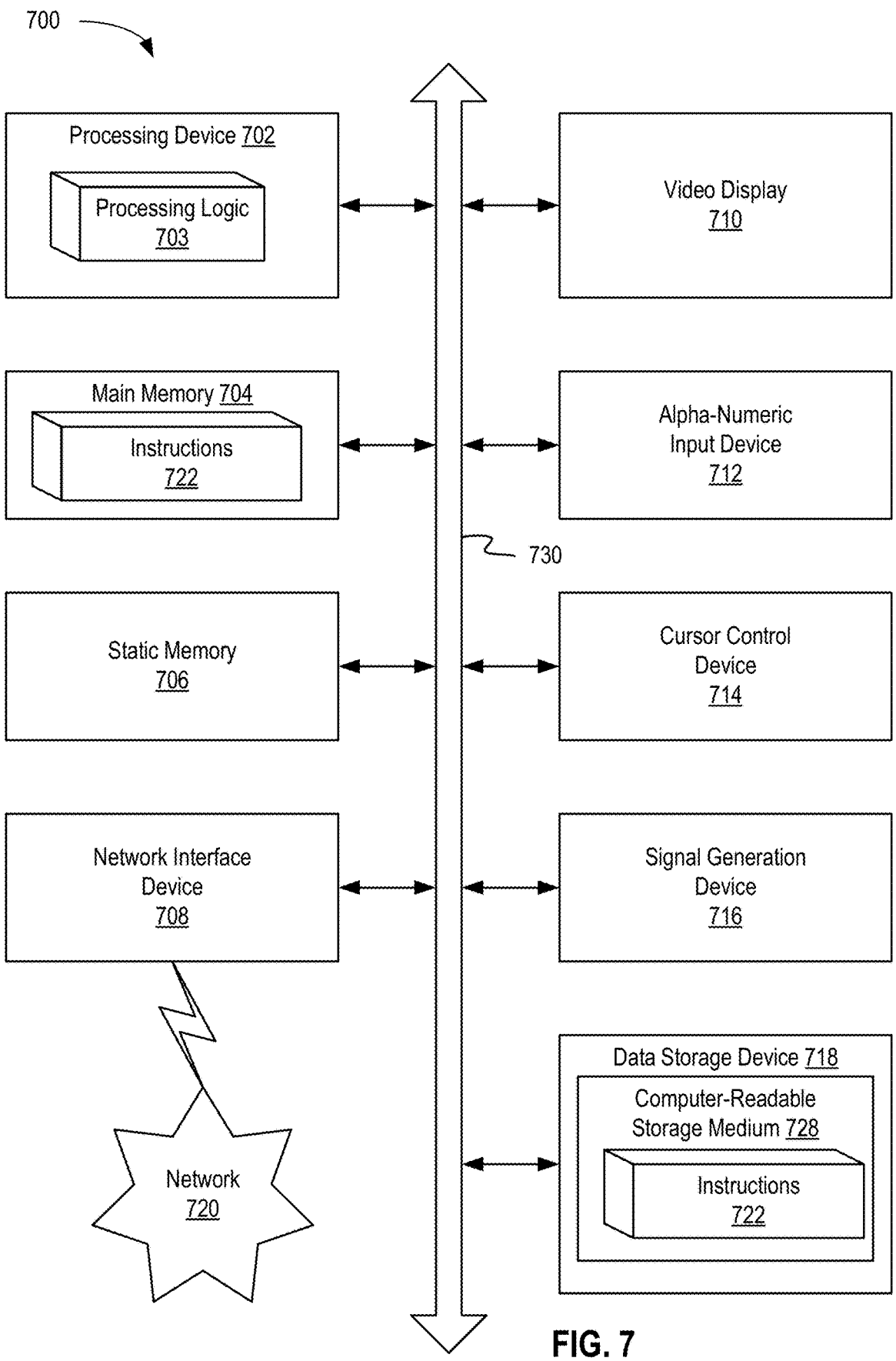
FIG. 7 depicts a block diagram of an example computer device capable of generating and using grid-based graph representations for efficient implementations of graph-mapped computing applications, in accordance with at least some embodiments of the present disclosure.

FIG. 7 depicts a block diagram of an example computer device 700 capable of generating and using grid-based graph representations for efficient implementations of graph-mapped computing applications, in accordance with at least some embodiments of the present disclosure. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 (which can include processing logic 703) represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions executing method 600 of generating and using grid-based graph representations for efficient implementations of graph-mapped computing applications.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions executing method 600 of generating and using grid-based graph representations for efficient implementations of graph-mapped computing applications.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    obtaining, using a first memory device, a first representation of a graph, wherein the graph maps a plurality of entities associated with a computing program, and wherein the first representation identifies a plurality of nodes of the graph and a plurality of nodal connections of the graph;
    selecting, using a processing device and based at least on the first representation, a reference grid (RG);
    generating, using the processing device, a second representation of the graph, the second representation comprising, for each block of at least a subset of a plurality of blocks of the RG, presence or absence of the nodal connections, along each of a plurality of RG directions, of one or more nodes of the plurality of nodes of the graph, wherein the one or more nodes are assigned to a respective block; and
    performing, using the second representation, one or more operations of the computing program.

2. The method of claim 1, wherein the first representation of the graph comprises an uncompressed representation of the graph.

3. The method of claim 2, wherein the uncompressed representation comprises at least one of a hash map, an adjacency list, or an adjacency matrix.

4. The method of claim 1, wherein the RG comprises at least one of a two-dimensional grid of blocks or a three-dimensional grid of blocks.

5. The method of claim 1, wherein generating the second representation of the graph comprises:
    performing an initial assignment of the plurality of nodes of the graph among a plurality of cells of the RG, wherein each of the plurality of blocks of the RG comprises two or more cells of the plurality of cells of the RG;
    identifying one or more multi-cell nodal connections; and
    adding one or more dummy nodes to transform the one or more multi-cell nodal connections to one or more adjacent-cell nodal connections.

6. The method of claim 5, further comprising:
    rearranging the initial assignment of the plurality of nodes of the graph among the plurality of cells of the RG to reduce at least one dimension of the RG.

7. The method of claim 5, wherein one or more locations for the one or more dummy nodes are determined using a cost function, wherein the cost function assigns at least one of a first cost to an added dummy node or a second cost to an added nodal connection associated with the added dummy node.

8. The method of claim 1, wherein selecting the RG comprises selecting a dimensionality of the RG based at least on a number of nodes of the plurality of nodes of the graph.

9. The method of claim 8, wherein selecting the dimensionality of the RG is further based at least on a number of nodal connections of the plurality of nodal connections of the graph.

10. The method of claim 1, wherein the second representation of the graph comprises a sequence of bits for the respective block, wherein a first portion of the sequence of bits identifies the one or more nodes assigned to the respective block, and wherein a second portion of the sequence of bits identifies one or more directions of the nodal connections associated with the one or more nodes assigned to the respective block.

11. The method of claim 10, wherein the one or more operations of the computing program comprise a graph traversal operation for at least a portion of the graph, the graph traversal operation comprising:
    identifying at least one nodal connection between a first block of the plurality of blocks of the RG and a second block of the plurality of blocks of the RG using the sequence of bits of the first block and the sequence of bits of the second block.

12. The method of claim 1, wherein performing the one or more operations of the computing program comprises:
    identifying, using the second representation, one or more clusters of the graph, wherein at least one cluster of the one or more clusters has no external nodal connections and comprises one or more blocks of the plurality of blocks of the RG.

13. The method of claim 1, wherein performing the one or more operations of the computing program comprises:
    storing the second representation of the graph using at least one of the first memory device or a second memory device;
    accessing the second representation of the graph using the at least one of the first memory device or the second memory device; and
    restoring the first representation of the graph using the second representation of the graph.

14. The method of claim 1, wherein generating the second representation of the graph is performed, at least partially, using a graphics processing unit (GPU).

15. A system comprising:
    a memory device; and
    one or more processing devices, communicatively coupled to the memory device, to:
        obtain, using the memory device, a first representation of a graph, wherein the graph maps a plurality of entities associated with a computing program, and wherein the first representation identifies a plurality of nodes of the graph and a plurality of nodal connections of the graph;
        select, using the first representation, a reference grid (RG);

generate a second representation of the graph, the second representation comprising, for each block of at least a subset of a plurality of blocks of the RG, presence or absence of the nodal connections, along each of a plurality of RG directions, of one or more nodes of the plurality of nodes of the graph, wherein the one or more nodes are assigned to a respective block; and perform, using the second representation, one or more operations of the computing program.

16. The system of claim 15, wherein to generate the second representation of the graph, the one or more processing devices are to:

perform an assignment of the plurality of nodes of the graph among a plurality of cells of the RG, wherein at least one block of the plurality of blocks of the RG comprises two or more cells of the plurality of cells of the RG;

identify one or more multi-cell nodal connections; and add one or more dummy nodes to transform the one or more multi-cell nodal connections to adjacent-cell nodal connections.

17. The system of claim 16, and wherein the one or more processing devices are further to:

rearrange the assignment of the plurality of nodes of the graph among the plurality of cells of the RG to reduce at least one dimension of the RG.

18. The system of claim 15, wherein the second representation of the graph comprises a sequence of bits for the respective block, wherein a first portion of the sequence of bits identifies the one or more nodes assigned to the respective block, and wherein a second portion of the sequence of bits identifies one or more directions of the one or more nodal connections associated with the one or more nodes assigned to the respective block.

19. The system of claim 18, wherein the one or more operations of the computing program comprise a graph traversal operation for at least a portion of the graph, and wherein to perform the graph traversal operation, the one or more processing devices are further are to:

identify at least one nodal connection between a first block of the plurality of blocks of the RG and a second block of the plurality of blocks of the RG using the sequence of bits of the first block and the sequence of bits of the second block.

20. The system of claim 18, wherein the one or more operations of the computing program comprise a clustering operation for at least a portion of the graph, and wherein to perform the clustering operation, one or more processing devices are further to:

identify, using the second representation, one or more clusters of the graph, wherein at least one cluster of the one or more clusters has no external nodal connections and comprises one or more blocks of the plurality of blocks of the RG.

21. A processor comprising:

one or more processing units to:

obtain a first representation of a graph, wherein the graph maps a plurality of entities associated with a computing program, and wherein the first representation identifies a plurality of nodes of the graph and a plurality of nodal connections of the graph;

select, using the first representation, a reference grid (RG);

generate a second representation of the graph, the second representation comprising, for each block of at least a subset of a plurality of blocks of the RG, presence or absence of the nodal connections, along each of a plurality of RG directions, of one or more nodes of the plurality of nodes of the graph, wherein the one or more nodes are assigned to a respective block; and perform, using the second representation, one or more operations of the computing program.

22. The processor of claim 21, wherein the processor is comprised in at least one of:

a control system for an autonomous or semi-autonomous machine;

a perception system for an autonomous or semi-autonomous machine;

a system for executing one or more real-time streaming applications;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational artificial intelligence operations;

a system for generating synthetic data;

a system incorporating one or more virtual machines (VMs);

a system implemented at least partially in a data center; or a system implemented at least partially using cloud computing resources.

\* \* \* \* \*